Figure 1:
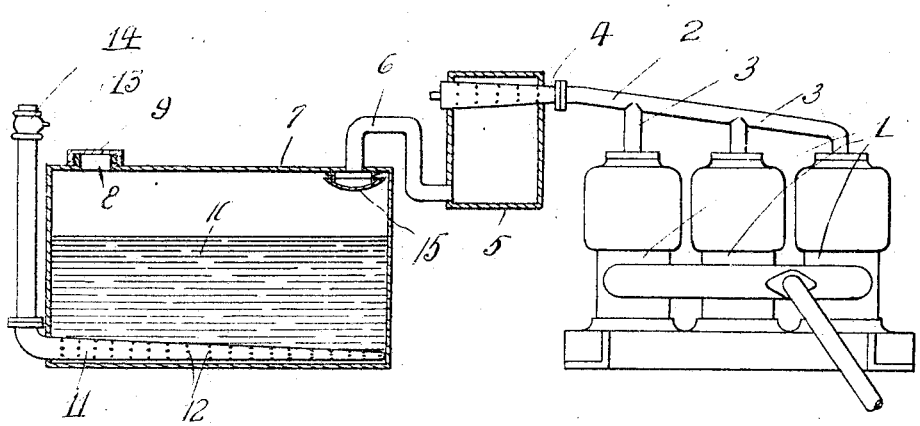

R. C. DAWSON.
CARBURETING APPARATUS.
APPLICATION FILED MAY 28, 1909.

956,048. Patented Apr. 26, 1910.

Inventor
R. C. Dawson

Witness

UNITED STATES PATENT OFFICE.

ROBERT C. DAWSON, OF WAMPUM, PENNSYLVANIA, ASSIGNOR OF ONE-HALF TO HARRY BARTOW, OF SEANOR, PENNSYLVANIA.

CARBURETING APPARATUS.

956,048.   Specification of Letters Patent.   Patented Apr. 26, 1910.

Application filed May 28, 1909. Serial No. 498,909.

*To all whom it may concern:*

Be it known that I, ROBERT C. DAWSON, a citizen of the United States of America, residing at Wampum, in the county of Lawrence and State of Pennsylvania, have invented certain new and useful Improvements in Carbureting Apparatus, of which the following is a specification, reference being had therein to the accompanying drawing.

This invention relates to a carbureting apparatus for carbureting air to form a combustible mixture for use in connection with explosive engines of automobiles and similar vehicles, the apparatus being conveniently located relative to the engine.

The invention aims to provide simple and effective means for expeditiously vaporizing gasolene and impregnating air with the vapor to that extent that the same can be used in an explosive engine of an automobile. To this end I provide two tanks, one containing an air and fuel mixer connected direct to the manifold of a gasolene engine, while the other contains gasolene into which air is drawn through the action of the engine.

My apparatus will be hereinafter considered in detail and then claimed, and reference will now be had to the drawing forming a part of this specification, wherein there is illustrated the preferred embodiment of my invention, but it is to be understood that the structural elements thereof are susceptible to various changes without departing from the spirit and scope of the invention.

Figure 2:
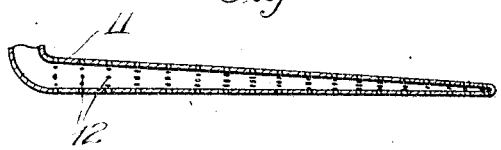
Figure 3:
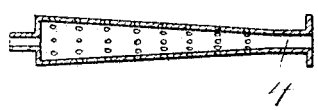

In the drawings:—Figure 1 is a longitudinal sectional view of the carbureting apparatus, Fig. 2 is a similar view of an air inlet nozzle, and Fig. 3 is a similar view of an air and fuel mixer.

In the accompanying drawings, 1 designates a gasolene explosive engine of the well known and ordinary type. It is in connection with this engine that I dispense with the use of carbureters, and connect the manifold of the engine by a pipe 2 and branches 3 to one end of a tapering perforated air and fuel mixer 4. The air and fuel mixer 4 is located in the upper end of a tank 5, and has its other end open exteriorly of said tank 5. The lower end of the tank 5 is connected by a pipe 6 to a gasolene tank 7. The gasolene tank 7 is provided with an opening 8 normally closed by a cap 9, whereby gasolene 10 can be placed within the tank.

Extending into the tank 7 within the bottom thereof is an air inlet nozzle 11 which is preferably tapered and perforated, as at 12. This nozzle is connected to a stand pipe 13 having an ordinary check valve 14.

15 designates a deflector suspended within the tank 7 beneath the end of the pipe 6, to prevent the raw gasolene 10 from entering said pipe.

In operation, the engine 1 creates a suction in the air and fuel mixer 4 and tends to create a vacuum in the tank 5, pipe 6 and tank 7, and this partial vacuum causes the check valve 14 to open and admit air through the nozzle 11 into the tank 7. The air passes upwardly through the gasolene 10 and passes into the mixer tank 5, where the impregnated air commingles with the air taken in through the air and fuel mixer 4. The deflector 15 is simply used as a safety factor to prevent raw gasolene from passing into the pipes 6 and the tank 5.

Having now described my invention what I claim as new, is:—

1. In a carbureting apparatus for automobiles, the combination with an engine, of a mixer tank, an air and fuel mixer located in the upper end of said tank and adapted to connect with the engine, a gasolene tank, a pipe connecting said gasolene tank with the lower end of said mixer tank, a perforated tapering inlet nozzle extending into said gasolene tank at the bottom thereof, a stand pipe connecting with said nozzle, exteriorly of said gasolene tank and a check valve carried by said stand pipe.

2. A carbureting apparatus for automobiles, comprising a gasolene tank, an air inlet nozzle extending into said gasolene tank, a stand pipe connecting with said nozzle exteriorly of said tank and provided with a check valve, a mixer tank, means for establishing communication between the gasolene tank and the mixer tank, and a perforated air and fuel mixer extending through the said mixer tank and adapted to communicate at one end with the engine whereby on the operation of the engine a suction is created in the air and fuel mixer and a partial vacuum is formed in the gasolene tank and stand pipe whereby the check valve is opened and air is admitted into the gasolene tank, and said air and fuel mixer having its other end opening into the atmosphere.

In testimony whereof I affix my signature in the presence of two witnesses.

ROBERT C. DAWSON.

Witnesses:
   H. S. MILES,
   J. DINELINGE.